United States Patent [19]

Berg

[11] Patent Number: 5,735,782
[45] Date of Patent: Apr. 7, 1998

[54] ROBOT INSTALLATION

[75] Inventor: Arne Berg, Västerås, Sweden

[73] Assignee: Asea Brown Boveri AB, Västerås, Sweden

[21] Appl. No.: 809,183

[22] PCT Filed: Sep. 22, 1995

[86] PCT No.: PCT/SE95/01080

§ 371 Date: Apr. 14, 1997

§ 102(e) Date: Apr. 14, 1997

[87] PCT Pub. No.: WO96/09145

PCT Pub. Date: Mar. 28, 1996

[30] Foreign Application Priority Data

Sep. 23, 1994 [SE] Sweden ................................ 9403211

[51] Int. Cl.⁶ ............................ B23Q 3/157; B26D 1/24
[52] U.S. Cl. ........................... 483/1; 83/481; 483/13; 483/31; 483/63; 483/901
[58] Field of Search ............................ 483/901, 902, 483/13, 31, 58, 69, 27, 54, 55, 60; 219/69.15; 414/751; 83/481, 480, 779, 495; 901/41, 42, 30, 16

[56] References Cited

U.S. PATENT DOCUMENTS

| | | | |
|---|---|---|---|
| 3,727,503 | 4/1973 | Braner et al. | 83/479 |
| 4,164,879 | 8/1979 | Martin | 483/13 X |
| 4,183,273 | 1/1980 | Greinke et al. | 83/479 |
| 4,587,716 | 5/1986 | Bytow | 483/58 X |
| 4,655,676 | 4/1987 | Jannborg et al. | 901/31 |
| 4,802,274 | 2/1989 | Petrof et al. | 483/1 |
| 5,044,064 | 9/1991 | Muselli | 483/901 X |
| 5,183,377 | 2/1993 | Becker et al. | 901/16 X |

FOREIGN PATENT DOCUMENTS

| | | | |
|---|---|---|---|
| 4027987 | 3/1991 | Germany | 483/62 |
| 130106 | 6/1987 | Japan | 483/13 |
| 4354641 | 12/1992 | Japan | 483/58 |
| 2126136 | 3/1984 | United Kingdom | 483/50 |

*Primary Examiner*—William R. Briggs
*Attorney, Agent, or Firm*—Watson Cole Stevens Davis, P.L.L.C.

[57] ABSTRACT

An installation in a slitter mill for mounting a tool set (5), composed of annular tool parts (3), on a set-up device (1) provided with bars (2). The tool parts (3) are stored in a plurality of magazines (4) in a tool storage. A gantry robot (9) is adapted to collect tool parts (3) from the magazines (4) by means of a gripper (7) and to temporarily store the tool parts (3) in an associated intermediate magazine (13). The robot (9) with the intermediate magazine (13) moves between the magazines (4) and collects the desired tool parts (3) by means of the gripper (7) for loading a tool set in the intermediate magazine. A transfer device (15) is adapted to lift and transfer to the bars (2) a tool set present in the intermediate magazine (13). (FIG. 2).

9 Claims, 4 Drawing Sheets

ROBOT INSTALLATION

TECHNICAL FIELD

The present invention relates to a device and a method for setting up and dismantling a set of tools on a tool magazine, for example slitting tools in a slitter. Such a slitter comprises a mill stand with an upper and a lower roll, on which a number of tools are set up, such as cutting rings, spacer rings, and pressure disks. A long plate wound on a roller is brought to run through the mill stand, whereby the plate is cut into smaller widths suited to the customers.

BACKGROUND ART

A production cycle in a slitter comprises cutting out, tool exchange, adjustments, etc. The productive part of the cycle is the actual cutting out, that is, the time it takes to cut out a plate in a mill stand. The inactive part of the cycle may be designated set-up time, which substantially comprises time for handling the plate and time for setting up and dismantling cutting tools on the mill stand. Cutting out in a mill stand of a plate from a plate roll of about 60 tons takes about 10 minutes whereas the set-up time is considerably longer. For efficient production it is required that, above all, the set-up time be minimized and that part of the set-up time may occur in parallel with the cutting out.

A method for setting up a mill stand is known, in which a set-up device with four pairs of bars are used as intermediate storage for pre-mounted tool sets for cutting out. The set-up device is adapted to be moved between a mounting station, where premounting of tool sets takes place, and a docking station at the mill stand, where the pairs of bars of the set-up device are docked with the roll pair in the mill stand. For this purpose, the end wall of the mill stand can be opened and the rolls be removed from each other such that tool sets from the bars of the set-up device may be independently transferred to the rolls of the mill stand. After setting up, the end wall is closed and the rolls are moved towards each other such that the lower and upper cutting tools engage with each other. The method may also be used when dismantling tool sets, in which case the procedure described above is carried out in reverse order.

Such a plant with a set-up device provided with bars is described, for example, in the pamphlet "Rational Coil Slitting System" (RCSS), published by, inter alia, ABB Production Development AB, and shown is FIG. 1. Two robots are each fetching tools with the aid of an annular gripper from a plurality of tool magazines in separate tool storages and mount the tools on the pair of bars. One robot mounts on the upper bar and the other robot on the lower bar. A tool set comprises a combination of a large number of annular tools, such as cutting rings, spacer rings, and pressure disks. The tools are stored, with their plane surfaces horizontally oriented, as piles in vertical tool magazines. For fetching a tool, each robot gripper is first oriented horizontally over the pile of tools in a selected magazine, whereupon the gripper is lowered until mechanical contact is obtained with the uppermost tool. Three mechanical hooks grip centrally from the inside about the annular tool and lift it out of the tool magazine. The robot then positions the gripper transversally with the secured tool and at the same time moves it to a point right in front of the bar served by the robot. During the movement, the gripper is aligned such that the tool is oriented with its axis parallel to and centred with the longitudinal axis of the bar. Upon attained position and alignment, the tool is pushed onto the bar and detached from the gripper, whereafter the robot returns to mount the next tool in a repeated cycle. When dismounting, the method described above is carried out in reverse order.

Whereas previously the tools were mounted manually direct on the pair of rolls in the mill stand, the introduction of the set-up device entails a considerable saving of time since the tool mounting may be carried out in parallel with the cutting out in the mill stand. The introduction of robots for mounting of the tool sets on the set-up device entails an additional saving of time. Still, however, the time for mounting and dismounting the set-up device is many times longer than the time for cutting out and hence decisive of the capacity of the slitter. An additional problem is that the set-up station with its two robots with separate tool storages takes up a large area.

SUMMARY OF THE INVENTION

The object of the present invention is to further shorten the time for mounting and dismounting of tool sets on the set-up device, to simplify the handling of tools, and to limit the working area of the mounting station. This is achieved by a robot installation with a robot, preferably a gantry (or portal) robot, which from one tool storage only fetches and mounts tools on the set-up device. The robot comprises a gripper, an intermediate magazine, and a transfer device. The intermediate magazine, which is supported by the robot, comprises a centring means and a leveling fork and is adapted to temporarily store a tool set. The leveling fork is adapted to automatically raise or lower the pile of tools at the intermediate magazine, such that their upper surface is always adjusted to the same level. The gripper is thus given a constant working point for collecting or delivering a tool in the intermediate magazine. The transfer device is adapted to lift a tool set mounted in the intermediate magazine, by means of unfolding guide wings with resilient jaws at their ends, and to transfer the tool set to the set-up device. The transfer device may also retain a mounted tool set while a new tool set is mounted in the intermediate magazine. A pushing device, which comprises a carriage with two pushing arms, is placed below the pair of bars of the set-up device and adapted to push a tool set, located on a bar, to a docking area at the free end of the bar or inversely.

Since the robot with its gripper successively loads the intermediate magazine with tools carried by the robot, and the transfer device, only when the intermediate magazine is fully loaded, transfers the assembled tool set to the set-up device or direct to the rolls of a mill stand, the time for new set-up is considerably reduced, since the robot movement per tool is minimized. An additional advantage is obtained in that the transfer by means of the transfer device results in the tool sequence in the intermediate magazine becoming the same as when mounting directly on the bars of the set-up device and, therefore, can be easily visually checked.

BRIEF DESCRIPTION OF THE DRAWINGS

The invention will be explained in greater detail by description of an embodiment with reference to the accompanying drawings, wherein.

DESCRIPTION OF THE PREFERRED EMBODIMENTS

Figure 1:
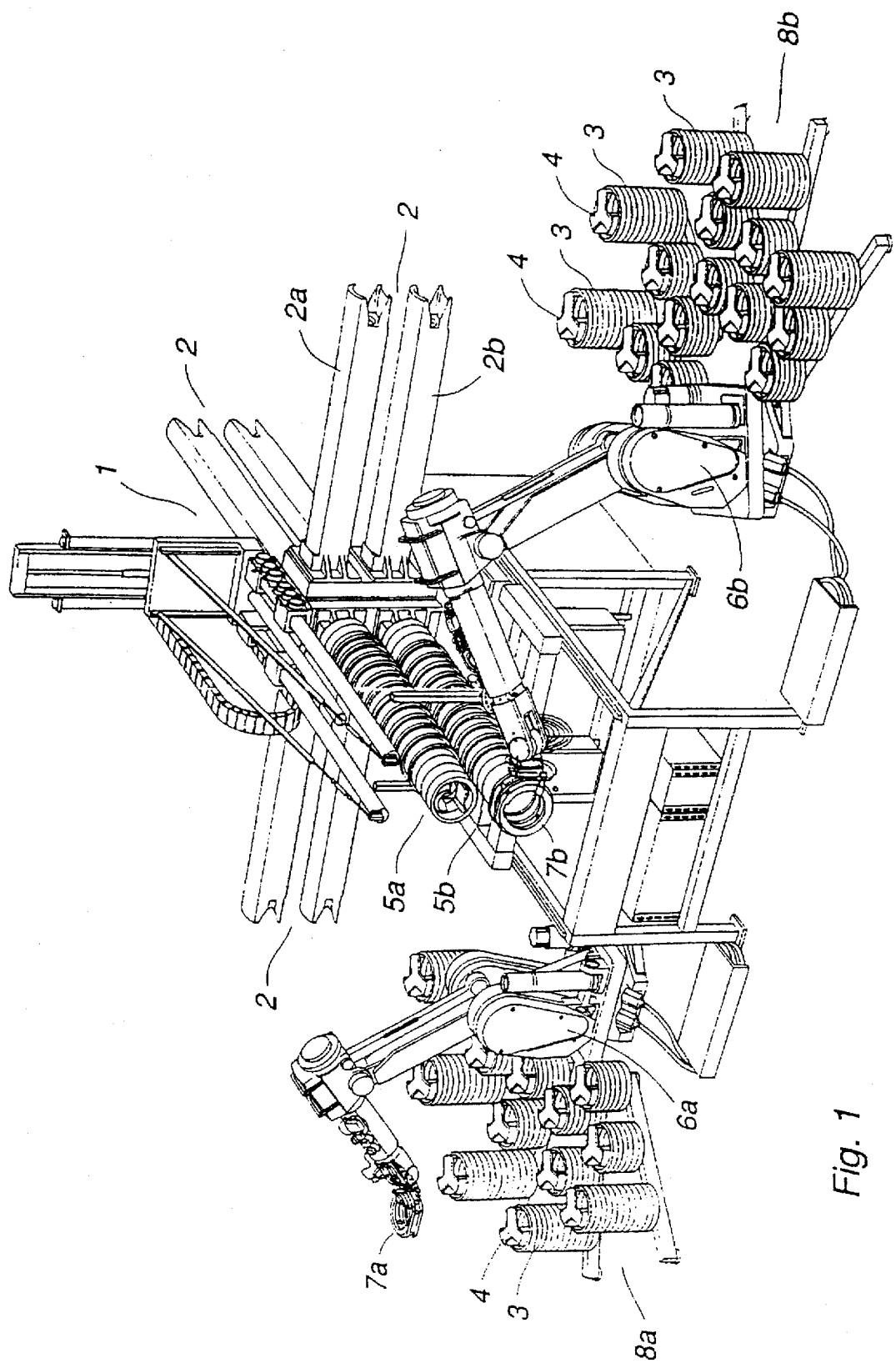
FIG. 1 shows a known set-up station.

A known mounting station for mounting and dismounting a first tool set 5a on an upper bar 2a and a second tool set 5b on a lower bar 2b in a set-up station 1 is shown in FIG. 1. The tool sets are built up of optional combinations of a large number of annular tools 3, such as cutting rings, spacer rings, and pressure disks. The tools 3 are stored lying in a plurality of vertical tool magazines 4 in two tool storages. A first robot 6a collects tools 3 with the aid of an annular gripper 7a from the tool magazine 4 in a first tool storage and mounts the tools 3 to the tool set 5a on the set-up device 1. A similar robot 6b collects tools 3 in similar manner from the tool magazine 4 in a tool storage 8b for mounting in a second tool set 5b on the bar 2b.

The set-up device 1 is adapted to be moved between the set-up station and a mill stand (not shown) of a slitter and may be rotated in both directions around a vertical axis. The set-up device 1 comprises a parallelepiped central body, to which is fixed, in each of the four sides, a horizontally oriented pair of bars 2, the upper bar 2a of which is placed vertically above a lower bar 2b and parallel thereto. Each pair of bars 2 is adapted to dock with a pair of rolls in the mill stand and has the same length and the same distance between it as the rolls. Upon docking between a pair of bars and a pair of rolls, the premounted tool sets are transferred from the bars to the rolls or inversely. With the aid of the set-up device 1, the rolls in the mill stand may be rapidly dismantled and set up. Upon dismantling, the tool sets located on the pair of rolls are pushed in their entirety over to the corresponding pair of bars 2 in the docked set-up device 1. Upon subsequent setting up, the set-up device 1 is first rotated so as to permit docking between the pair of rolls and a pair of bars with premounted tool sets, which are pushed over to the pair of rolls in a corresponding manner.

Figure 2:
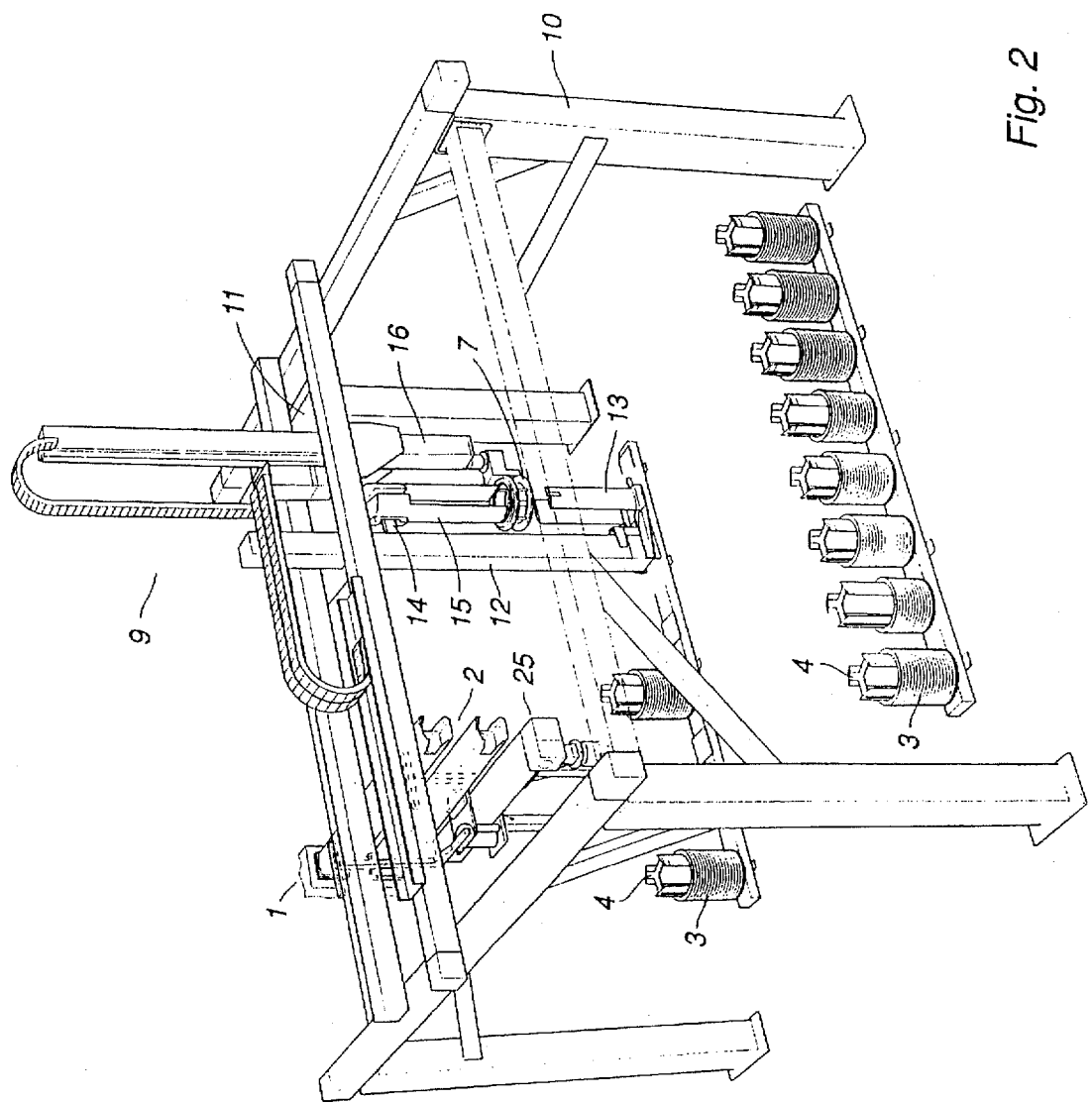
FIG. 2 shows a set-up station according to the invention.

A set-up station according to the invention, which utilizes the known transfer device 1, is shown in FIG. 2. A gantry robot 9, for example according to the ABB Production Development AB pamphlet UA 9402-S, comprising a gantry stand 10 which is fixed against a base plate and supports a robot carriage 11, movable in the horizontal plane, with three arms, is adapted to collect annular tools 3 from a plurality of tool magazines 4 in a tool storage, which is housed below the gantry stand 10, and to mount them on a pair of bars 2 of a set-up device 1 (only partially shown). The carriage 11 supports a first arm 16, movable in the vertical direction, with an annular gripper 7 rotatable about a vertical axis, a second fixed arm 12 to which an intermediate magazine 13 is fixed, and a third arm 14, movable in the vertical direction, with a transfer device 15 rotatable about a horizontal axis.

Figure 3:
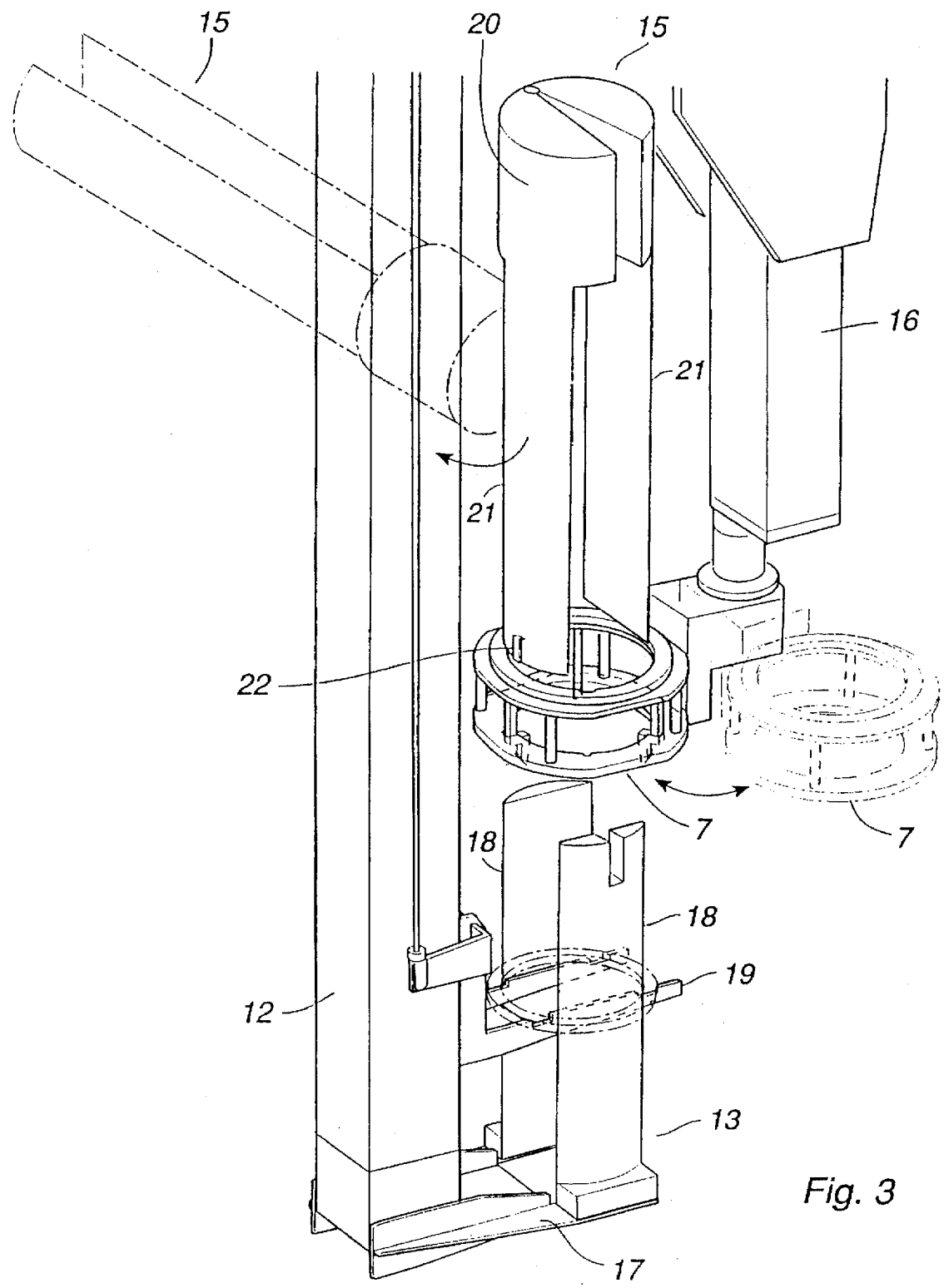
FIG. 3 shows an intermediate magazine and a transfer device.

The intermediate magazine 13, as shown in FIG. 3, comprises a cantilever-shaped supporting plate 17, fixed to the second arm 12, with two vertically oriented supporting wings 18, between which a vertically extending leveling fork is arranged. The supporting wings 18 are adapted to center the tools, whereas the leveling fork 19 is adapted to automatically lift the stacked tools 3 such that the upper surface of the stack is kept at a constant height. Because the upper surface of the stack of tools is always the same, a defined delivery position and collection position, respectively, are imparted to the gripper 7. Therefore, the gripper 7 need not seek a position for delivering tools which is dependent on the number of stacked tools 3 but can immediately adopt a predetermined position for delivering or collecting tools.

The transfer device 15 comprises a cylindrical head 20, composed of two parts, with a guide wing 21 projecting from each part. The guide wings 21, which are oriented parallel, are rotatable towards and away from each other around an axis which is eccentrically arranged through the head 20 and parallel to the guide wings. The transfer device 15 is adapted to be rotated around a horizontal axis, fixed to the third arm 14, from a vertically downwardly-directed position centred over the intermediate magazine 13 to a horizontal position (shown in dash-dotted line), which permits centring with the pair of bars 2 of the set-up device 1. The guide wings 21 are adapted to dock with, on the one hand, the supporting wings 18 of the intermediate magazine 13 and, on the other hand, the upper bar 2a or the lower bar 2b of the set-up device 1. Upon docking with the intermediate magazine 13, the guide wings 21 are fitted so as to overlap with the supporting wings 18 on the inside of the tools 3 stacked on the intermediate magazine 13. The guide wings 21 are deflected away from each other, causing the stack of tools to be centred and the two resilient jaws 22 in the outer end of the guide wings to engage the lowermost tool from the inside, permitting the transfer device 15 to lift the mounted stack of tools out of the intermediate magazine 13. Upon docking with the set-up device 1, the transfer device 15 is rotated to the horizontal position (dash-dotted) while being moved and centred in front of the upper bar 2a or the lower bar 2b of the set-up device, whereupon the guide wings 21 are fitted so as to overlap the bar in question. The guide wings 21 are rotated towards each other, allowing the tool set to be loosened and be delivered on the bar when the transfer device is withdrawn.

Figure 4:
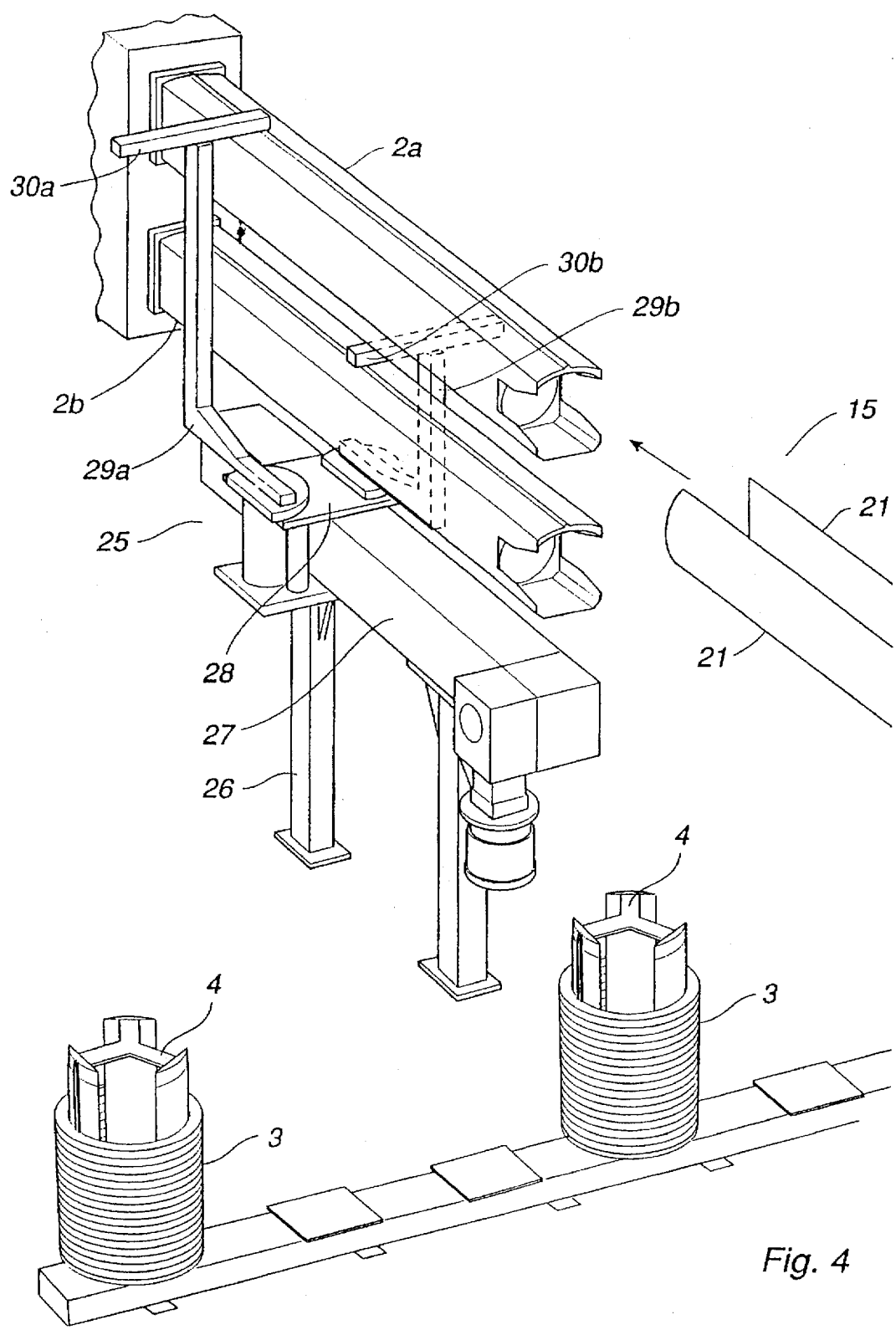
FIG. 4 shows a pushing device.

A pushing device 25 is placed below a pair of bars 2 of the set-up device 1 according to FIG. 4, this pair of bars 2 being oriented towards the robot 9. A stand 26 fixed to a base plate supports a horizontal ruler 27 on which runs a carriage 28 with a first pushing arm 29a adapted to serve the upper bar 2a and a second pushing arm 29b adapted to serve the lower bar 2b. At the upper end of the each pushing arm, a hand 30 is fixed, which is adapted to engage the end of the tool set present on the bar. Upon docking, the transfer device delivers the premounted tool set to a docking area on one of the outer ends of the bars. The carriage 28 is moved in parallel with the lower bar 2b to a position at the free end of the bar, whereupon the arm 29 associated with the bar in question is rotated around a vertical axis such that the hand 30, fixed to the end thereof, engages the tool set. When the carriage 28 is again moved towards the centre of the set-up device 1, the tool set present on the transfer device 15 is pushed with the aid of the hand 30 away from the docking area, which is thus released for a new transfer of tools.

The method for mounting a tool set 5a on the upper bar 2a fixed to the set-up device 1, and a tool set 5b on the lower bar 2b is carried out in such a way that the gantry robot 9 by means of the gripper 7 successively loads the intermediate magazine 13 with a tool set, whereupon this tool set is transferred in its entirety to the set-up device. At a collect position assumed by the robot 9 at a selected tool magazine 4, the deflected gripper 7 (shown in dash-dotted line) is centred over the tool magazine 4. The first arm 16 is lowered until the gripper 7 makes mechanical contact with the tool 3 stored at the top of the tool magazine 4. The gripper 7 engages the tool 3 with three gripping claws on the inside and lifts it up. As soon as the tool 3 has been lifted from the tool magazine 4, the robot starts moving to the next selected tool magazine 4. In parallel with the movement, the gripper 7 assumes the correct position in height where it is rotated so as to be oriented over the intermediate magazine 13 associated with the robot, whereupon the gripper 7 assumes the predetermined position for delivery of tools. The gripper 7 releases the tool 3, which is positioned on top of the tools stacked in the intermediate magazine. The leveling fork 19 lowers the stack of tools such that its surface is again adjusted to the delivery position. Meanwhile the robot has had time to assume a collect position at a new tool magazine 4 in order to load another tool 3 in the intermediate magazine 4 using the above-mentioned method. When the intermediate magazine 13 is fully loaded, the gripper 7 is turned aside, whereupon the vertically adjusted transfer device 15 docks with the intermediate magazine 13. The guide wings 21 of the transfer device 15 are fitted so as to overlap the supporting wings 18 of the intermediate magazine 13, whereupon the guide wings 21 are unfolded, causing the resilient lugs 22 to engage the tool 3 stored at the bottom of the intermediate magazine. The transfer device 15 then lifts the loaded tool set and retains it in a rest position while the robot 9 loads another tool set in the intermediate magazine 13. When also this has been loaded, the robot 9 moves to the set-up device 1, whereupon docking and transfer of tools are performed in a manner described above.

In certain cases, the intermediate magazine 13 may carry only part of a complete tool set, and so the method described above is carried out several times to transfer a complete tool set to the pair of bars. The intermediate magazine is not limited to only carrying one tool set but may be designed to be docked itself to a set-up device for transfer of sets of tools.

The method described above relates to mounting of sets of tools on the pairs of bars 2 of the set-up device 1. When dismantling tools, the same method is applied in reverse order.

The invention is not limited to mounting tool sets on the bars of the set-up device but can mount or set up tool sets direct on the rolls of a mill stand. The invention may also be used in other applications where it is advantageous to temporarily store objects mounted into a unit in an intermediate magazine fixed to a robot.

I claim:

1. An installation for mounting a tool set (5), composed of tool parts, on a set-up device (2), comprising at least one manipulator (9) which by means of a gripper (7) collects the tool parts (3) from a plurality of magazines (4) and delivers them to the set-up device (2), characterized in that the manipulator (9) comprises an intermediate magazine (13) for temporary storage of a tool set under build-up and a transfer device (15) for transfer of the tool set to the set-up device (2), whereby the manipulator (9) carries the intermediate magazine (13) and the transfer device (15), and is adapted to move between the magazines (4) and with the aid of the gripper (7) collect tool parts (3) to deliver them into the intermediate magazine (13).

2. An installation according to claim 1, characterized in that the manipulator (9) comprises a gantry robot with a carriage (11) which is movable in the horizontal plane and comprises a first vertically displaceable arm (16) which supports the gripper (7) rotatable about a vertical axis, a second fixed arm (12) supporting the intermediate magazine (13), and a third vertically displaceable arm (14), which supports the transfer device (15) which is rotatable about a horizontal axis.

3. An installation according to claim 1, characterized in that the intermediate magazine (13) comprises at least two vertical supporting wings (18), adapted to center the tools (3).

4. An installation according to claim 1, characterized in that the intermediate magazine (13) comprises a leveling fork (19) adapted to carry the stacked tools (3) and automatically lift the stack of tools such that its upper surfaces is kept substantially constant.

5. An installation according to claim 1, characterized in that the transfer device (15) comprises two guide wings (21) capable of docking with the intermediate magazine (13) and with the set-up device (2), said guide wings being adapted to guide and retain a tool set during a transfer from the intermediate magazine (13) to the set-up device (2).

6. An installation according to claim 1, characterized in that the set-up device (2) consists of a roll of a mill stand in a slitter.

7. An installation according to claim 1, characterized in that the set-up device (2) consists of a tool set carrier (1) provided with bars, said tool set carrier being adapted to dock with a pair of rolls of a mill stand, whereby a complete tool set is transferred in its entirety to the mill stand.

8. An installation according to claim 1, characterized in that the set-up device (2) is associated with a pushing device (25), which comprises a carriage (28) displaceable along the set-up device (2), at least one rotatable arm (29) with a hand (30) being arranged on said carriage (28) for pushing a tool set onto the set-up device (2).

9. A method for setting up tool sets (5), wherein a plurality of tool parts (3) from a plurality of magazines (4) are assembled on a set-up device (2), characterized in that the tool parts (3) are collected by a manipulator (9) and composed into a tool set (5) in an intermediate magazine (13) supported by the manipulator, and that the tool set is thereafter transferred to the set-up device (2) by a transfer device (15) supported by the manipulator.

* * * * *